United States Patent Office 3,116,290
Patented Dec. 31, 1963

3,116,290
16-ALKYL-6,9-DIFLUORO-STEROIDS AND PROCESSES
Frank A. Cutler, Jr., Westfield, and John M. Chemerda, Metuchen, N.J., assignors to Merck & Co., Inc., Rahway, N.J., a corporation of New Jersey
No Drawing. Filed Dec. 1, 1961, Ser. No. 156,470
8 Claims. (Cl. 260—239.55)

This invention relates to novel 16-lower alkyl steroids. More particularly, it is concerned with 6,9-difluoro-21-desoxy-16-lower alkyl steroids of the pregnane series and processes for preparing these compounds.

In accordance with the present invention, it is now found that these 6,9-difluoro-21-desoxy-16-lower alkyl steriods of the pregnane series possess valuable pharmacological properties as progrestational and anti-inflamatory agents.

It is an object of the present invention to provide novel 6,9-difluoro-21-desoxy-16-lower alkyl steriods of the pregnane series. An additional object of this invention is to provide intermediate products useful in the preparation of these new compounds. Other objects will be apparent from the detailed description of this invention hereinafter provided.

These novel 6,9-difluoro-21-desoxy-16-lower alkyl steroids, subject of the present invention, may be chemically represented as follows:

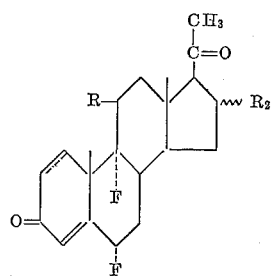

wherein R is selected from the group consisting of keto and hydroxy, $R_2$ is a lower alkyl group of the $\alpha$- or $\beta$-configuration and the dotted line at C–1 indicates the presence of either a single or double bond.

According to the present invention, it is now found that a 9$\alpha$-fluoro-11-keto-16-lower alkyl-4-pregnene-3,20-dione may be converted to the corresponding 6,9-difluoro-11-oxygenated-16-lower alkyl-4-pregnene compound and the 1-dehydro derivatives thereof by procedures which may be shown as follows:

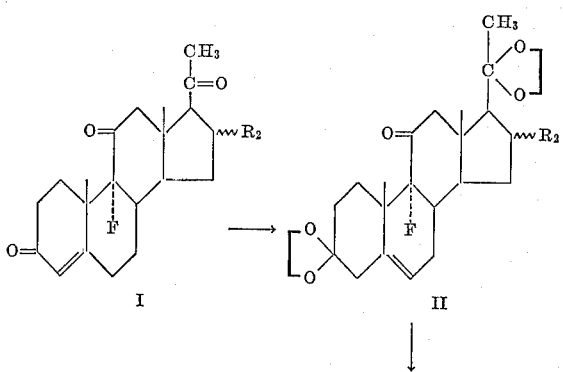

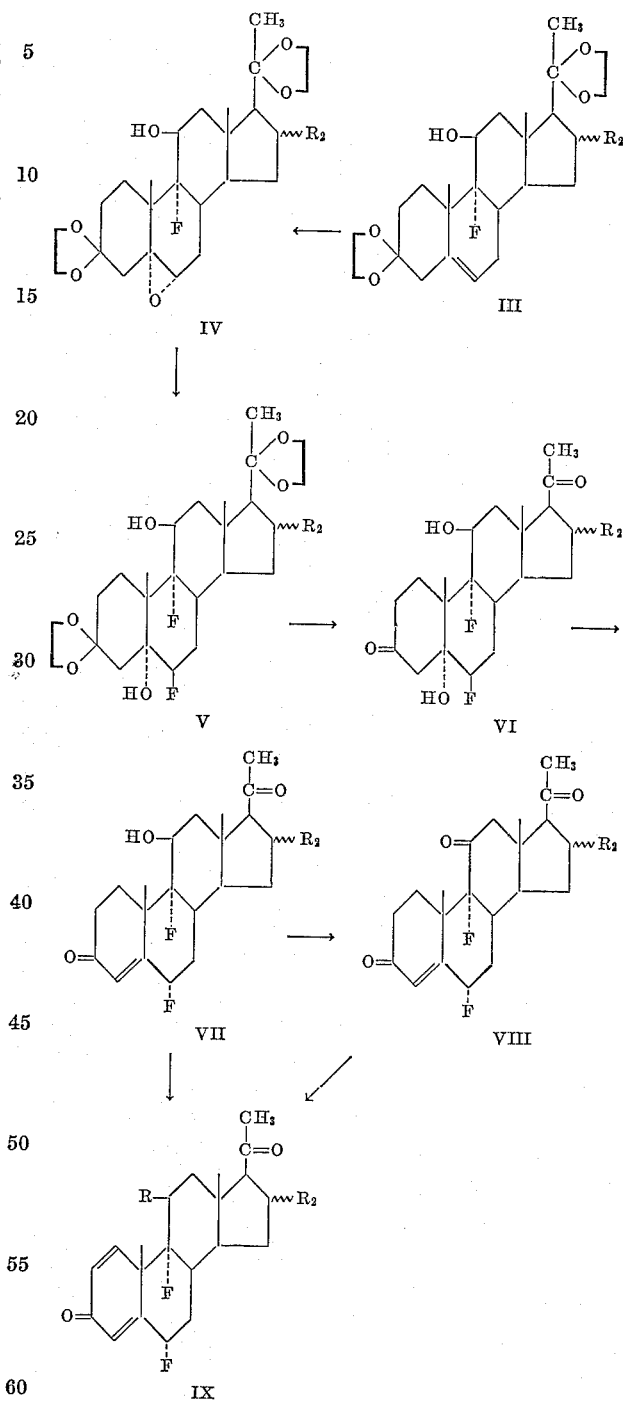

wherein R is keto or hydroxy, and wherein $R_2$ is lower alkyl and may be either of the $\alpha$- or $\beta$-configuration.

In the foregoing process the starting compound 9$\alpha$-fluoro-11-keto-16-lower alkyl-4-pregnene - 3,20 - dione is first reacted with a ketalizing agent to obtain the corresponding 3,20-bisketal-5-pregnene Compound II. The reaction of this compound with a reducing agent such as lithium aluminum hydride produces the corresponding 11β-hydroxy Compound III. When this 11β-hydroxy-5-pregnene compound is reacted with an organic peracid, the 5α,6α-oxido Compound IV is formed. Reaction of this latter compound with a fluorinating agent such as hydrogen fluoride or the like yields the 5α-hydroxy-6β-fluoro intermediate (V), which upon contact with a strong organic acid results in the formation of the corresponding 6β,9α-difluoro - 16 - lower alkyl-5α,11β-dihydroxy-4-pregnene-3,20-dione (VI).

The reaction of this latter compound with a strong mineral acid results in the removal of the 5α-hydroxy group and formation of the corresponding 4-pregnene Compound VII. This compound may then be contacted with a chemical or microbiological dehydrogenating agent to form the corresponding 11β-hydroxy-1,4-pregnadiene Compound IX. Alternatively, Compound VII may first be contacted with an oxidizing agent to form the corresponding 11-keto steroid (VIII), which may then be dehydrogenated to yield Compound IX.

In one embodiment of the above-described process, the starting compound, i.e. 9α-fluoro-11-keto-16α (or β)-methyl-4-pregnene-3,20-dione is reacted with a suitable ketalizing agent, preferably ethylene glycol, to form the corresponding 3,20-bisketal. When ethylene glycol is used, the reaction is desirably carried out in the presence of a strong acid such as p-toluenesulfonic acid, orthochlorobenzenesulfonic acid or the like to produce the corresponding 3,20-bis-ethylenedioxy Compound II. Thus, reaction of the steroid starting material dissolved in an organic solvent such as benzene or toluene with ethylene glycol is conducted in the presence of p-toluenesulfonic acid by refluxing the reaction mixture for a suitable period of time during which water is separated from the mixture as it forms. The 3,20-bisethylene ketal compound is then conveniently recovered from a concentrated solution of the resultant mixture by crystallization from a solvent such as ether or ether-petroleum ether mixtures.

The next step of the process is effected by reacting the 3,20-bisethylene ketol compound with a strong reducing agent such as lithium aluminum hydride or sodium borohydride to produce the corresponding 11β-hydroxy steriod. This reaction is most conveniently effected by dissolving the steroid material in a suitable solvent, preferably anhydrous ether, adding lithium aluminum hydride and storing the mixture at room temperature for from about 1–3 hours. The resulting 11β-hydroxy compound is then recovered, for example by evaporating the solvent and leaving a crystalline residue of 3,20-bisethylenedioxy-9α-fluoro-11β-hydroxy - 16 - methyl-5-pregnene (III).

In the following step the 11β-hydroxy-5-pregnene is reacted with a peracid to produce the corresponding 5α,6α-oxido compound. Such acids as perbenzoic, peracetic, perphthalic and the like may satisfactorily be employed in this method, although perbenzoic acid is preferred. This reaction is readily achieved by dissolving the steroid compound in a solvent such as benzene, acetic acid, ethyl acetate or the like and adding thereto a solution of perbenzoic acid dissolved in benzene. The solution is then desirably stored at room temperature for about 40–80 hours, whereupon the 5α,6α-oxide may conveniently be recovered by concentrating the solution to a small residue and triturating the residue with ether to yield the crystalline steroid (IV). Advantageously, prior to concentrating the solution the reaction mixture may first be treated with sodium bisulfite solution to reduce excess perbenzoic acid, followed by treatment with sodium bicarbonate to remove any benzoic acid thus formed.

The next step of the process is carried out by reacting the 5α,6α-oxido compound with a fluorinating agent, such as hydrogen fluoride or boron trifluoride. A mixture of hydrogen fluoride and tetrahydrofuran in the ratio of 2 to 1 by weight has been found to be particularly advantageous as the fluorinating agent in this process. Thus, the reaction is most conveniently conducted by dissolving the 5,6-oxido steroid in a suitable solvent such as acetone, ether, chloroform or the like, and cooling the solution to about —60° C. The cooled solution is then added to a mixture of hydrogen fluoride and tetrahydrofuran. For obtainment of maximum yields it has been found desirable to conduct this step of the reaction at 0° C. for a period of about 4–6 hours. After completion of the reaction, the 6β,9α-difluoro steroid is readily recovered by neutralizing the reaction mixture, for example with aqueous potassium bicarbonate, separating the organic solvent layer, and concentrating the solution to a small residue, which, upon trituration with a suitable solvent such as ether, yields crystalline 16-methyl-3,20-bisethylenedioxy - 6β,9α - difluoropregnane-5α,11β-diol (V).

This latter compound is readily converted to the desired 6α,9α-difluoro-11-oxygenated-4-pregnene by hydrolysis of the 3,20-bisethylene ketal groups followed by removal of the 5α-hydroxy group. This is readily achieved by first contacting the 3,20-bisethylenedioxy steroid with an organic acid. Thus, for example, by contacting 16α-methyl-3,20-bisethylenedioxy - 6β,9α - difluoropregnane-5α,11β-diol dissolved in aqueous acetone with p-toluenesulfonic acid at room temperature for about 3–5 hours there is obtained the corresponding 3,20-diketo Compound VI which may conveniently be recovered by evaporating the acetone solvent to yield an aqueous suspension of crystalline product which can then be evaporated to dryness.

The 5α-hydroxy-6β-fluoropregnane is advantageously converted to the corresponding 6α-fluoro-4-pregnene by contacting this material with a strong mineral acid such as hydrochloric acid. Thus, for example, 16α-methyl-6β,9α-difluoro - 5α,11β - dihydroxypregnane-3,20-dione dissolved in chloroform may be contacted with hydrogen chloride gas at low temperature for a period of about 1 hour whereupon the reaction mixture is advantageously washed free of acid, the solvent removed and the residue triturated with ether to produce crystalline 16α-methyl-6α,9α-difluoro-11β-hydroxy-4-pregnene-3,20-dione (VII).

This 6α,9α-difluoro compound is readily converted to the corresponding 11-keto Compound VIII by reaction with a suitable oxidizing agent. Desirably, the conversion is effected by contacting the steroid compound with chromium trioxide, or with aluminum isopropoxide and cyclohexanone. When chromium trioxide is employed as the oxidizing agent, the reaction is conveniently carried out by dissolving the 11β-hydroxy steroid in an inert organic solvent such as pyridine, adding this solution to a mixture of chromium trioxide dissolved in pyridine and allowing the mixture to stand for about 9–12 hours. The reaction mixture is then advantageously quenched with aqueous sodium sulfite solution and then made acidic with sulfuric or hydrochloric acid. Recovery is readily effected by concentrating the mixture to low volume and triturating with ether to give crystals of the corresponding 11-keto steroid Compound VIII.

Dehydrogenation of either Compound VII or Compound VIII yields the corresponding 11-oxygenated-1,4-pregnadiene compound. This dehydrogenation may conveniently be achieved either microbiologically, as for example with Bacillus sphaericus, or chemically, using preferably selenium dioxide. The selenium dioxide reaction is conveniently carried out in the presence of a lower alkanol such as t-butanol, and acetic acid. After completion of the reaction, the reaction mixture is extracted with a suitable solvent such as ethyl acetate, followed by washing first with alkaline and then acidic solutions. Following concentration to dryness, the residue is crystallized from such solvents as acetone, ether or acetone-ether mixtures to yield the corresponding 6,9-difluoro-16-methyl-11-oxygenated-1,4-pregnadiene Compound IX.

The following examples illustrate methods of carrying out the present invention but it is to be understood that these examples are given for purposes of illustration and not of limitation.

EXAMPLE 1

*16α-Methyl-3,20-Bisethylenedioxy-9α-Fluoro-5-Pregnene-11-One*

18 grams of 16α-methyl-9α-fluoro-4-pregnene-3,11,20-trione is dissolved in 890 ml. of benzene, 45 ml. of ethylene glycol and 1.78 grams of p-toluenesulfonic acid. The mixture is heated to the reflux temperature and the distillate is returned through a separator which removes the water. The reaction is allowed to proceed at the reflux temperature with good agitation until the theoretical amount of water has separated. The reaction mixture is then cooled to 25° and washed with two 200 ml. portions of water, 200 ml. of 10% sodium bicarbonate solution and 200 ml. of water. The benzene phase is then dried over anhydrous magnesium sulfate and concentrated under reduced pressure. The residue on trituration with ether yields crystalline 16α-methyl-3,20-bisethylenedioxy-9α-fluoro-5-pregnene-11-one.

In accordance with the foregoing procedure, but starting with 16β-methyl-9α-fluoro-4-pregnene-3,11,20-trione, there is obtained the corresponding 16β-methyl-3,20-bisethylenedioxy-9α-fluoro-5-pregnene-11-one.

EXAMPLE 2

*16α-Methyl-3,20-Bisethylenedioxy-9α-Fluoro-5-Pregnene-11β-Ol*

To a solution of 18 grams of 16α-methyl-3,20-bisethylenedioxy-9α-fluoro-5-pregnene-11-one in 8 liters of anhydrous ether is added 35 g. of lithium aluminum hydride. The mixture is stirred for an hour and then 2 l. of water is added slowly. The ether phase is separated, washed with water, dried over anhydrous magnesium sulfate and evaporated, leaving a crystalline residue of 16α-methyl-3,20-bisethylenedioxy-9α-fluoro-5-pregnene-11β-ol.

In accordance with the foregoing procedure, but starting with 16β-methyl-3,20-bisethylenedioxy-9α-fluoro-5-pregnene-11-one, there is obtained the corresponding 16β-methyl-3,20-bisethylenedioxy-9α-fluoro-5-pregnene-11β-ol.

EXAMPLE 3

*16α-Methyl-3,20-Bisethylenedioxy-9α-Fluoro-5α,6α-Oxido-Pregnane-11β-Ol*

To 150 ml. of a 0.4 M solution of perbenzoic acid in benzene is added 13.5 g. of 16α-methyl-3,20-bisethylenedioxy-9α-fluoro-5-pregnene-11β-ol. The solution is stored at 22–28° for 60 hours. At the end of this time, the benzene phase is washed successively with sufficient 15% sodium bisulfite solution to reduce excess perbenzoic acid, with 10% sodium bicarbonate solution to remove benzoic acid, and finally with water. The benzene phase is dried over anhydrous sodium sulfate and concentrated under reduced pressure. The residue is triturated with ether to give crystalline 16α-methyl-3,20-bisethylenedioxy-9α-fluoro-5α,6α-oxido-pregnane-11β-ol.

In accordance with the foregoing procedure, but starting with 16β-methyl-3,20-bisethylenedioxy-9α-fluoro-5-pregnene-11β-ol, there is obtained the corresponding 16β-methyl-3,20-bisethylenedioxy-9α-fluoro-5α,6α-oxido-pregnane-11β-ol.

EXAMPLE 4

*16α-Methyl-3,20-Bisethylenedioxy-6β,9α-Difluoro-Pregnane-5α-11β-Diol*

Ten grams of 16α-methyl-3,20-bisethylenedioxy-9α-fluoro-5α,6α-oxido pregnane-11β-ol is dissolved in 200 ml. of chloroform and the solution is cooled to −60°. The solution is added to a mixture of 100 ml. of tetrahydrofuran and 100 ml. of a hydrogen fluoride-tetrahydrofuran solution (2:1 by weight) at −50°. The mixture is allowed to warm to 0° and is held at that temperature for five hours. It is then poured into an excess of aqueous potassium bicarbonate solution. The chloroform phase is dried over anhydrous sodium sulfate and evaporated under reduced pressure. On trituration of the residue with ether, crystals of 16α-methyl-3,20-bisethylenedioxy-6β,9α-difluoropregnane-5α,11β-diol are obtained.

In accordance with the foregoing procedure, but starting with 16β - methyl-3,20-bisethylenedioxy-9α-fluoro-5α,6α-oxido pregnane-11β-ol, there is obtained the corresponding 16β - methyl-3,20 - bisethylenedioxy - 6β,9α - difluoropregnane-5α, 11β-diol.

EXAMPLE 5

*16α-Methyl-6β,9α-Difluoro-5α,11β-Dihydroxy-Pregnane-3,20-Dione*

7.3 grams of 16α-methyl-3,20-bisethylenedioxy-6β,9α-difluoropregnane15α,11β-diol is dissolved in a sufficient quantity of 80% acetone-20% water and containing two grams of p-toluenesulfonic acid. The solution is stored at room temperature for 4 hours. The mixture is then subjected to reduced pressure to remove the acetone, yielding an aqueous suspension of crystals of 16α-methyl-6β,9α-difluoro-5α,11β - dihydroxypregnane - 3,20 - dione, which crystals are collected, washed with water and dried.

In accordance with the foregoing procedure, but starting with 16β-methyl-3,20-bisethylenedioxy-6β,9α-difluoropregnane-5α,11β-diol, there is obtained the corresponding 16β-methyl-6β,9α - difluoro - 5α,11β - dihydroxypregnane-3,20-dione.

EXAMPLE 6

*16α-Methyl-6α,9α-Difluoro-11β-Hydroxy-4-Pregnene-3,20-Dione*

A solution of 1 gram of 16α-methyl-6β,9α-difluoro-5α,11β-dihydroxypregnane-3,20-dione in 60 ml. of chloroform is cooled in an ice-salt bath and saturated with hydrogen chloride gas over a period of thirty minutes. The chloroform phase is washed free of acid with water and is dried over anhydrous magnesium sulfate. After removal of the solvent under reduced pressure and trituration of the residue with ether, crystals of 16α-methyl-6α,9α-difluoro-11β-hydroxy-4-pregnene-3,20-dione are obtained.

In accordance with the foregoing procedure, but starting with 16β - methyl - 6β,9α - difluoro-5α,11β-dihydroxypregnane-3,20-dione, there is obtained the corresponding 16β - methyl-6α,9α-difluoro-11β-hydroxy-4-pregnene-3,20-dione.

EXAMPLE 7

*16α-Methyl-6α,9α-Difluoro-4-Pregnene-3,11,20-Trione*

A solution of 36.2 g. of 16α-methyl 6α,9α-difluoro-11β-hydroxy-4-pregnene-3,20-dione in 450 ml. of pyridine is added slowly to a cold mixture of 20 grams of chromium trioxide in 400 ml. of pyridine. The resulting mixture is allowed to stand at about 30° for ten hours and then is diluted slowly with 1000 ml. of aqueous sodium sulfite solution. The reaction mixture is then made acid with dilute sulfuric acid and the steroid is extracted into chloroform. The chloroform extract is washed with water, dried over sodium sulfate and concentrated under reduced pressure. The residue is triturated with ether to give crystalline 6α,9α-difluoro-16α-methyl-4-pregnene-3,11,20-trione.

In accordance with the foregoing procedure, but starting with 16β-methyl-6α,9α-difluoro-11β-hydroxy-4-pregnene-3,20-dione, there is obtained the corresponding 16β-methyl-6α,9α-difluoro-4-pregnene-3,11,20-trione.

EXAMPLE 8

*16α-Methyl-6α,9α-Difluoro-11β-Hydroxy-1,4-Pregnadiene-3,20-Dione*

To 100 mg. of 16α-methyl-6α,9α-difluoro-11β-hydroxy-4-pregnene-3,20-dione in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed for an additional 24 hours. The mixture is filtered, and the filtrate evaporated to dryness. The residue is extracted with ethyl acetate and the extract is washed successively with aqueous sodium bicarbonate, ammonium sulfide, dilute ammonia water, water, dilute hydrochloric acid and water, and then dried over magnesium sulfate. The extract is treated with activated charcoal and then concentrated to dryness. Crystallization of the residue from a mixture of acetone and ether gives 16α-methyl-6,9α-difluoro-11β-hydroxy-1,4-pregnadiene-3,20-dione.

In accordance with the foregoing procedure, but starting with 16β-methyl-6α,9α-difluoro-11β-hydroxy-4-pregnene-3,20-dione, there is obtained the corresponding 16β-methyl - 6α,9α - difluoro - 11β - hydroxy-1,4-pregnadiene-3,20-dione.

EXAMPLE 9

*16α-Methyl-6α,9α-Difluoro-1,4-Pregnadiene-3,11,20-Trione*

To 100 mg. of 16α-methyl-6α,9α-difluoro-4-pregnene-3,11,20-trione in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed for an additional 24 hours. The mixture is filtered, and the filtrate evaporated to dryness. The residue is extracted with ethyl acetate and the extract is washed successively with aqueous sodium bicarbonate, ammonium sulfide, dilute ammonia water, water, dilute hydrochloric acid and water, and then dried over magnesium sulfate. The extract is treated with activated charcoal and then concentrated to dryness. Crystallization of the residue from a mixture of acetone and ether gives 16α-methyl-6α,9α-difluoro-1,4-pregnadiene-3,11,20-trione.

In accordance with the foregoing procedure, but starting with 16β - methyl-6α,9α-difluoro-4-pregnene-3,11,20-trione, there is obtained the corresponding 16β-methyl-6α,9α-difluoro-1,4-pregnadiene-3,11,20-trione.

The starting materials employed in accordance with this process may be prepared as follows:

A medium is prepared having the following composition:

Glucose _____g__ 20
An enzymatic lactoalbumen digest (Edamin)____g__ 20
Cornsteep liquor_____ml__ 5
Water to make 1 liter.

This medium is distributed in 50 ml. portions in appropriate vessels. The pH of the medium is adjusted to 6.5 with 1 M potassium hydroxide and sterilized at 120° C. for 12 minutes.

The medium in each vessel is then inoculated with a heavy aqueous suspension of spores of a strain of *Rhizopus nigricans* (American Type Culture Collection No. 6227b) and the inoculated media are maintained at an incubation of 28° C. for 48 hours on a rotary shaking machine.

Ten mg. of 16α-methylprogesterone is added to each vessel from a dimethyl-formamide solution (100 mg./ml.). The transformation is allowed to go for an additional 24 hours under conditions identical to the growth phase. The whole broth is then extracted 3 times with equal volumes of ethyl acetate, the extracts combined, and finally concentrated. The 11α-hydroxy-16α-methylprogesterone is filtered off.

Four hundred and twenty milligrams of 11α-hydroxy-16α-methylprogesterone is dissolved in a solution of 6.4 ml. of pyridine and 2.6 ml. of methanesulfonyl chloride at 0° C. The reaction mixture is then warmed to room temperature and allowed to stand for two hours. The reaction mixture is then added to 10 ml. of ice-water and extracted with 3×30 ml. of ethyl acetate. The extracts are combined, washed with dilute hydrochloric acid, sodium bicarbonate solution, water, dried and evaporated to dryness resulting in 11α-hydroxy-16α-methylprogesterone 11α-mesylate.

The 11α-hydroxy-16α-methylprogesterone 11α-mesylate (450 mg.) is treated with 610 mg. of sodium acetate and 6 ml. of acetic acid at reflux for thirty minutes. The reaction mixture is then cooled, diluted with water and extracted with 3×50 ml. of ether. The extracts are combined, washed with sodium bicarbonate solution, water, dried and evaporated to dryness resulting in crystalline $\Delta^{9(11)}$-16α-methylprogesterone.

$\Delta^{9,11}$-16α-methylprogesterone (260 mg.) and N-bromosuccinimide (218 mg.) are dissolved in 3 ml. of acetone at 0° C. with stirring. To this stirred solution is added 0.72 ml. of aqueous perchloric acid (0.458 gr. of 70% aqueous perchloric acid in 16.5 ml. of water). The solution remains homogeneous for a few seconds and then a white precipitate of product forms. The reaction mixture is stirred at 0° C. for 2 hours. The product is filtered, washed with cold acetone and ether and air dried to give 9α-bromo-11β-hydroxy-16α-methylprogesterone.

To a solution of 226 mg. of 9α-bromo-11β-hydroxy-16α-methylprogesterone in 12 ml. of tetrahydrofuran is added 414 mg. of potassium carbonate in 7.2 ml. of water. The reaction mixture is stirred at room temperature for 12 hours, then extracted with ethyl acetate. The extracts are combined, washed with water and dried over sodium sulfate. Removal of the solvent results in 9β,11β-oxido-16α-methylprogesterone.

A solution of 157 mg. of 9β,11β-oxido-16α-methylprogesterone in 5 ml. of chloroform is added to a solution consisting of 2.5 ml. of tetrahydrofuran, 1.8 ml. of chloroform and 3.3 ml. of hydrogen fluoride in tetrahydrofuran (2:1 by weight) at 0° C. The reaction mixture is left at 0° C. for three hours and then left to warm to room temperature and poured into a mixture of 25 gr. of potassium carbonate, 40 grams of ice-water and 40 ml. of chloroform. The chloroform layer is separated and the aqueous layer washed with an additional 20 ml. of chloroform. The chloroform extracts are combined, washed with water, and dried over sodium sulfate. Removal of the solvent results in 9α-fluoro-11β-hydroxy-16α-methylprogesterone.

To a solution of 9α-fluoro-11β-hydroxy-16α-methylprogesterone (300 mg.) in 4.8 ml. of glacial acetic acid is added a solution of 90 mg. of chromium trioxide in 4.5 ml. of 90% aqueous acetic acid. After a total reaction time of thirty minutes, 2 ml. of ethanol is added and the reaction mixture is concentrated to a syrup under vacuum. The syrup is dissolved in chloroform, washed with sodium bicarbonate solution, water and dried over sodium sulfate. Removal of the solvent and crystallization from hot acetone results in 9α-fluoro-11-keto-16α-methylprogesterone.

In accordance with the foregoing procedures, but starting with 16β-methylprogesterone, there is obtained the corresponding 9α-fluoro-11-keto-16β-methylprogesterone.

Various changes and modifications may be made in carrying out the present invention without departing from the spirit and scope thereof. Insofar as these changes and modifications are within the purview of the annexed claims, they are to be considered as part of our invention.

We claim:

1. 3,20-bisethylenedioxy - 9α - fluoro-16-lower alkyl-5-pregnene-11β-ol.

2. 16α-methyl - 3,20 - bisethylenedioxy - 9α - fluoro-5-pregnene-11β-ol.

3. 3,20-bisethylenedioxy - 9α - fluoro - 5α,6α - oxido-16-lower alkyl-pregnane-11β-ol.

4. 16α-methyl - 3,20 - bisethylenedioxy - 9α - fluoro-5α,6α-oxidopregnane-11β-ol.

5. 3,20-bisethylenedioxy - 6β,9α - fluoro-16-lower alkyl-pregnane-5α,11β-diol.

6. 16α-methyl - 3,20 - bisethylenedioxy - 6β,9α - difluoro-pregnane-5α,11β-diol.

7. 6β,9α - difluoro - 5α,11β - dihydroxy-16-lower alkyl-pregnane-3,20-dione.

8. 16α-methyl - 6β,9α - difluoro-5α,11β-dihydroxy pregnane-3,20-dione.

References Cited in the file of this patent

UNITED STATES PATENTS

| | | |
|---|---|---|
| 2,880,205 | Campbell et al. | Mar. 31, 1959 |
| 2,970,143 | Thomas et al. | Jan. 31, 1961 |

OTHER REFERENCES

Petrow et al.: J. Chem. Soc., page 3595 (1959).
Edwards et al.: J.A.C.S. 81, pages 3156–57 (1959).